April 9, 1968  J. B. JAVNER  3,376,993
COVER DEVICE FOR EAR OF ELECTRICAL BOX
Filed May 18, 1966
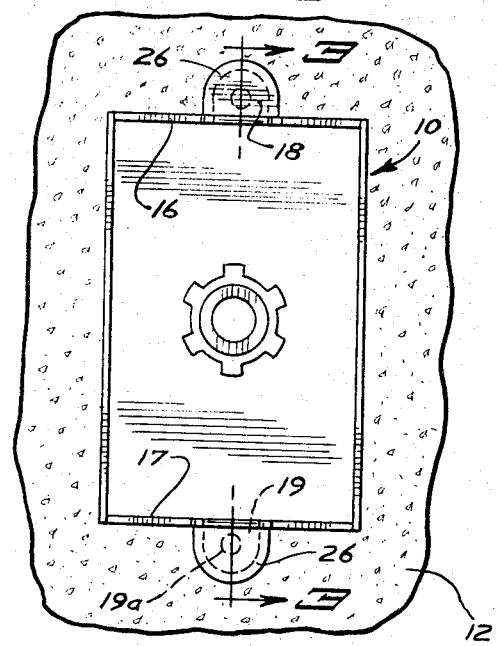
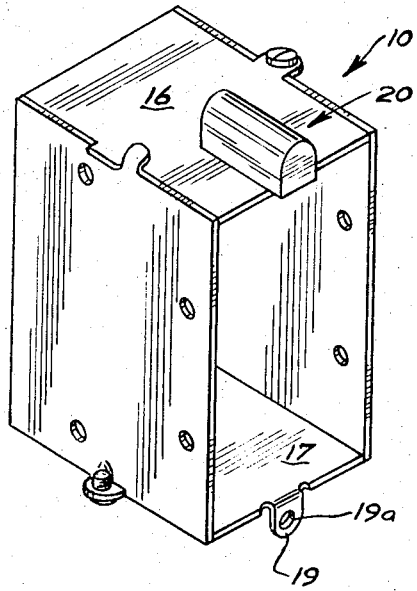
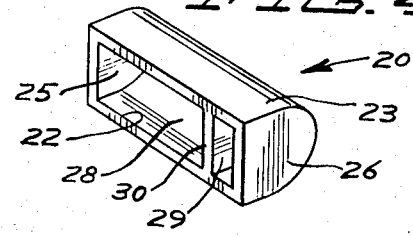
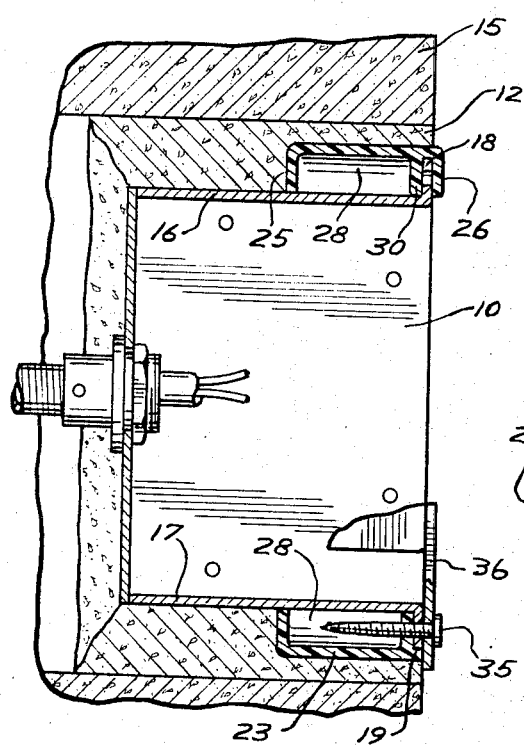
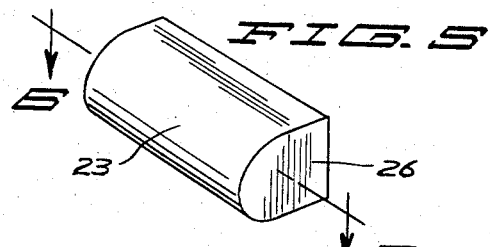
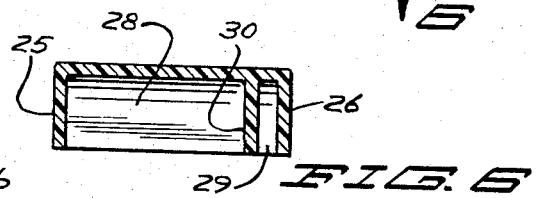
INVENTOR.
JOHN B. JAVNER
BY
ATTORNEYS United States Patent Office 3,376,993
Patented Apr. 9, 1968

3,376,993
COVER DEVICE FOR EAR OF ELECTRICAL BOX
John B. Javner, 3309 Winnetka, Ave.,
Minneapolis, Minn. 55427
Filed May 18, 1966, Ser. No. 551,166
2 Claims. (Cl. 220—3.4)

The invention herein relates to a cover device to overlie and protect the ear of an electrical box and to provide a passage for a screw driven through said ear.

As is well known in the art, electrical boxes are provided with ears to have switches or cover plates secured thereto. When electrical boxes are used in industrial buildings, the walls are formed of concrete and the electrical boxes are cemented in position as the wall is being formed by being imbedded within the wall. The ears of an electrical box are substantially flush with the face of the box and the box is imbedded to be flush with the facing surface of the wall. Concrete overlies the top and bottom of the box often filling the threaded aperture in the ear and blocking the passage of a screw therethrough. The wiring is completed after the wall structure is finished. It is desirable to have a convenient means to protect the ear and to provide for a passage therebehind free from blockage by the cement. The inventor has no knowledge of any simple device on the order of his invention.

It is an object of the invention herein therefore to provide a simply made and simply installed device to protect the ear of an electrical box and to provide passage for a screw therethrough.

It is a more specific object of this invention to provide a unitary housing adapted to receive an ear of an electrical box for anchorage thereto by frictional engagement therewith and providing for a passage extending from said ear.

These and other objects and advantages of the invention will be set forth in the following description made in connection with the accompanying drawings in which like reference characters refer to similar parts throughout the several views and in which:

FIG. 1 is a broken view in front elevation showing the device herein in operating position;

FIG. 2 is a view in perspective showing the device herein in operating position;

FIG. 3 is a view in vertical section taken on line 3—3 of FIG. 1 as indicated;

FIG. 4 is a bottom perspective view of the device herein;

FIG. 5 is a top perspective view of the device herein; and

FIG. 6 is a view longitudinal vertical section taken on line 6—6 of FIG. 5 as indicated.

With reference to the drawings, a conventional type of electrical box 10 is shown, and in FIGS. 1 and 3 said box is shown imbedded in concrete 12 of a wall 15. This type of installation is conventional for industrial and commercial construction. The concrete is placed about the box to position the same in the construction of a wall. The face of the box will be flush with the wall and the ears 18 and 19 of the box will be imbedded into the concrete and the area behind the ears will be filled with concrete. Said box is indicated as having a top wall 16 and a bottom wall 17. Said ears of said box will be apertured as at 19a.

Referring particularly to FIGS. 4–6, the device comprising the invention herein is indicated generally by the reference numeral 20. Said device is shown as a housing substantially semi-cylindrical in form and this may be readily formed of suitable plastic material.

Said housing has an open bottom 22, an overlying wall 23 and end walls 25 and 26. Formed within said housing is an elongated chamber 28 and forwardly thereof is a narrow chamber 29. Separating said chambers is a wall 30.

The chamber 29 will be of a size to snugly receive therein an ear of said box 10 and its walls will have sufficient frictional engagement with said ear to anchor said housing 20 to said ear, as shown in FIGS. 2 and 3.

The forward end wall 26 and the chamber separating wall 30 will be frangible whereby the end wall 29 can readily be broken off with a tool such as a screwdriver and a screw 35 can be driven through the wall 30, as shown in FIG. 3. The chamber 28 will be of sufficient length to receive and provide clear passage for the screw 35.

Operation

Prior to an electrical box being positioned in a wall under construction, a cover device 10 will be positioned over each ear of the electrical box. The chamber 29 will be of such size that its walls will have sufficient frictional engagement or a sufficiently snug engagement with an ear for the cover device to be held in position thereon.

The chamber 28 extends rearwardly of the ear.

When the box is mounted to be flush with a wall, the end wall 29 of the housing 20 will project sufficiently to be readily located when the wall is finished. This end wall 29 is readily broken off as with a screwdriver or other suitable tool and the threaded aperture in the ear will be clear and ready to receive a screw. A screwdriver through the ear or the screw itself can readily rupture the wall 30. In FIG. 3, the strap portion 36 of a switch is shown secured to the ear 19 by said screw 35.

But for the use of a device such as that comprising the invention herein, the apertures in ears of a box and the spaces behind the ears become filled with concrete and a drill may be required to open the aperture in the ear and to clear out a passage therebehind.

Thus it is seen that I have provided a relatively inexpensive and simply constructed cover device for an electrical box which is very simple to install and use in operating position.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A cover device to protect the ear of an electrical box and to provide a passage for a screw disposed through said ear, said device comprising a housing having a flat bottom and a front wall, an elongated open bottom chamber within said housing, a second open bottom chamber within said housing forward of said first mentioned chamber, a common wall separating said chambers, said common wall and said front wall being formed to be frangible, said second mentioned chamber being arranged and formed of a size to snugly receive said ear for frictional engagement therewith to anchor said housing thereto, and said first mentioned chamber overlying said box rearwardly of said ear.

2. The structure set forth in claim 1, wherein said second mentioned chamber is arranged and constructed to be of a form and size approximating that of said ear to receive said ear therein and have snug engagement therewith.

References Cited

UNITED STATES PATENTS

| | | | |
|---|---|---|---|
| 3,001,663 | 9/1961 | Takvorian et al. | 220—3.4 |
| 3,123,244 | 3/1964 | Amundson | 220—3.4 |
| 3,140,958 | 7/1964 | Opotow et al. | 220—3.4 |

THERON E. CONDON, *Primary Examiner.*

J. R. GARRETT, *Assistant Examiner.*